US011061969B1

(12) United States Patent
Shams et al.

(10) Patent No.: US 11,061,969 B1
(45) Date of Patent: Jul. 13, 2021

(54) INSTANCE BACKED MOBILE DEVICES WITH MULTIPLE INSTANCES

(71) Applicant: Amazon Technologies, Inc., Seattle, WA (US)

(72) Inventors: Khawaja Salman Shams, Seattle, WA (US); Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 14/754,604

(22) Filed: Jun. 29, 2015

(51) Int. Cl.
*G06F 16/00* (2019.01)
*G06F 16/951* (2019.01)
*H04L 29/08* (2006.01)

(52) U.S. Cl.
CPC ............ *G06F 16/951* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 6,249,836 B1 | 6/2001 | Downs et al. | |
| 6,665,565 B1 | 12/2003 | Stomberg et al. | |
| 7,805,706 B1 | 9/2010 | Ly et al. | |
| 8,391,226 B2 | 3/2013 | Rune | |
| 8,621,069 B1 | 12/2013 | Tompkins | |
| 8,788,855 B2 | 7/2014 | Cong et al. | |
| 9,256,467 B1 | 2/2016 | Singh et al. | |
| 9,313,172 B1 | 4/2016 | Brandwine | |
| 9,449,346 B1 | 9/2016 | Hockey et al. | |
| 9,461,876 B2 | 10/2016 | Van Dusen et al. | |
| 9,489,832 B2 * | 11/2016 | Nair | G05B 19/418 |
| 9,753,669 B2 | 9/2017 | Ben-Shaul et al. | |
| 10,083,030 B1 * | 9/2018 | Fant, IV | G06F 8/61 |
| 10,645,582 B2 | 5/2020 | Wohlert et al. | |
| 2003/0032417 A1 | 2/2003 | Minear et al. | |
| 2004/0040025 A1 | 2/2004 | Lehtinen | |
| 2004/0054997 A1 | 3/2004 | Katragadda et al. | |
| 2006/0136928 A1 | 6/2006 | Crawford et al. | |
| 2006/0168575 A1 | 7/2006 | Bhatt et al. | |

(Continued)

FOREIGN PATENT DOCUMENTS

NO 2014047073 A1 3/2014

OTHER PUBLICATIONS

International Search Report and Written Opinion dated Feb. 16, 2016, issued in International Patent Application No. PCT/US2015/050513, filed Sep. 16, 2015, 20 pages.

(Continued)

*Primary Examiner* — Debbie M Le
(74) *Attorney, Agent, or Firm* — Davis Wright Tremaine LLP

(57) ABSTRACT

A service provider may provide a plurality of companion instances associated with a mobile device in order to facilitate operation of the mobile device. The companion instances and the mobile device may be configured to execute various components of one or more application. Furthermore, the companion instances may execute various operations on behalf of the mobile device. The operations may be directed to particular companion instances of the plurality of companion instances based on various factors, such as an ability of the particular companion instances to perform the operations.

22 Claims, 9 Drawing Sheets

(56) References Cited

U.S. PATENT DOCUMENTS

| | | | |
|---|---|---|---|
| 2006/0168581 A1 | 7/2006 | Goger et al. | |
| 2007/0118657 A1 | 5/2007 | Kreitzer et al. | |
| 2007/0245331 A1 | 10/2007 | Daynes et al. | |
| 2010/0131792 A1 | 5/2010 | Herrod | |
| 2010/0153941 A1 | 6/2010 | Borissov et al. | |
| 2010/0318999 A1* | 12/2010 | Zhao | G06F 9/5044 718/104 |
| 2011/0022633 A1 | 1/2011 | Bernosky et al. | |
| 2012/0297311 A1 | 11/2012 | Duggal | |
| 2013/0029641 A1 | 1/2013 | Hickie | |
| 2013/0073600 A1* | 3/2013 | Jenkins | G06F 9/5027 709/201 |
| 2013/0109371 A1 | 5/2013 | Brogan et al. | |
| 2013/0191527 A1 | 7/2013 | Ashok et al. | |
| 2013/0297964 A1 | 11/2013 | Hegdal et al. | |
| 2014/0007214 A1* | 1/2014 | Qureshi | H04L 63/0428 726/12 |
| 2014/0149986 A1 | 5/2014 | S M et al. | |
| 2014/0153481 A1 | 6/2014 | Draznin et al. | |
| 2014/0173058 A1* | 6/2014 | Twitchell, Jr. | H04L 45/586 709/219 |
| 2014/0189388 A1 | 7/2014 | Lynar et al. | |
| 2014/0207680 A1 | 7/2014 | Rephlo | |
| 2014/0304356 A1 | 10/2014 | Allen, Sr. et al. | |
| 2014/0310792 A1 | 10/2014 | Hyland et al. | |
| 2014/0344446 A1 | 11/2014 | Rjeili et al. | |
| 2014/0351917 A1 | 11/2014 | Chickering | |
| 2015/0058473 A1 | 2/2015 | Grande | |
| 2015/0256423 A1 | 9/2015 | Stearns | |
| 2015/0331635 A1 | 11/2015 | Ben-Shaul et al. | |
| 2015/0350362 A1 | 12/2015 | Pollack et al. | |
| 2016/0034295 A1* | 2/2016 | Cochran | G06F 9/45558 718/1 |
| 2016/0048399 A1* | 2/2016 | Shaw | G01D 1/18 718/1 |
| 2016/0062623 A1 | 3/2016 | Howard et al. | |
| 2016/0092248 A1 | 3/2016 | Shani et al. | |
| 2016/0216991 A1* | 7/2016 | Ansari | G06F 9/45558 |
| 2017/0180346 A1 | 6/2017 | Suarez et al. | |
| 2017/0235848 A1 | 8/2017 | Van Dusen et al. | |
| 2017/0262697 A1 | 9/2017 | Kaps et al. | |

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion dated Feb. 4, 2016, International Patent Application No. PCT/US2015/059983, 12 pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Soltesz et al., "Container-based operating system virtualization: a scalable, high-performance alternative to hypervisors," ACM SIGOPS Operating Systems Review 41(3):275-287, Mar. 2007.

Thiele et al., "Embedded Software in Network Processors—Models and Algorithms," Lecture Notes in Computer Science 2211:416-34, Oct. 8, 2001.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Xavier et al., "Performance evaluation of container-based virtualization for high performance computing environments," Parallel, Distributed and Network-Based Processing (PDP), 2013 21st Euromicro International Conference, Feb. 2013, pp. 233-240.

Zhao et al., "Experimental study of virtual machine migration in support of reservation of cluster resources," Proceedings of the 2nd international workshop on Virtualization technology in distributed computing, Nov. 2007, pp. 1-8.

* cited by examiner

INSTANCE BACKED MOBILE DEVICES WITH MULTIPLE INSTANCES

CROSS REFERENCE TO RELATED APPLICATION

This application incorporates by reference for all purposes the full disclosure of co-pending U.S. patent application Ser. No. 14/488,195, filed Sep. 16, 2014, entitled "INSTANCE BACKED MOBILE DEVICES" and co-pending U.S. patent application Ser. No. 14/754,613, filed concurrently herewith, entitled "INSTANCE BACKED BUILDING OR PLACE."

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally, mobile devices are quickly outgrowing other form factors and the development of mobile applications is growing and becoming more ambitious.

BRIEF DESCRIPTION OF THE DRAWINGS

Various embodiments in accordance with the present disclosure will be described with reference to the drawings, in which.

DETAILED DESCRIPTION

Figure 1:
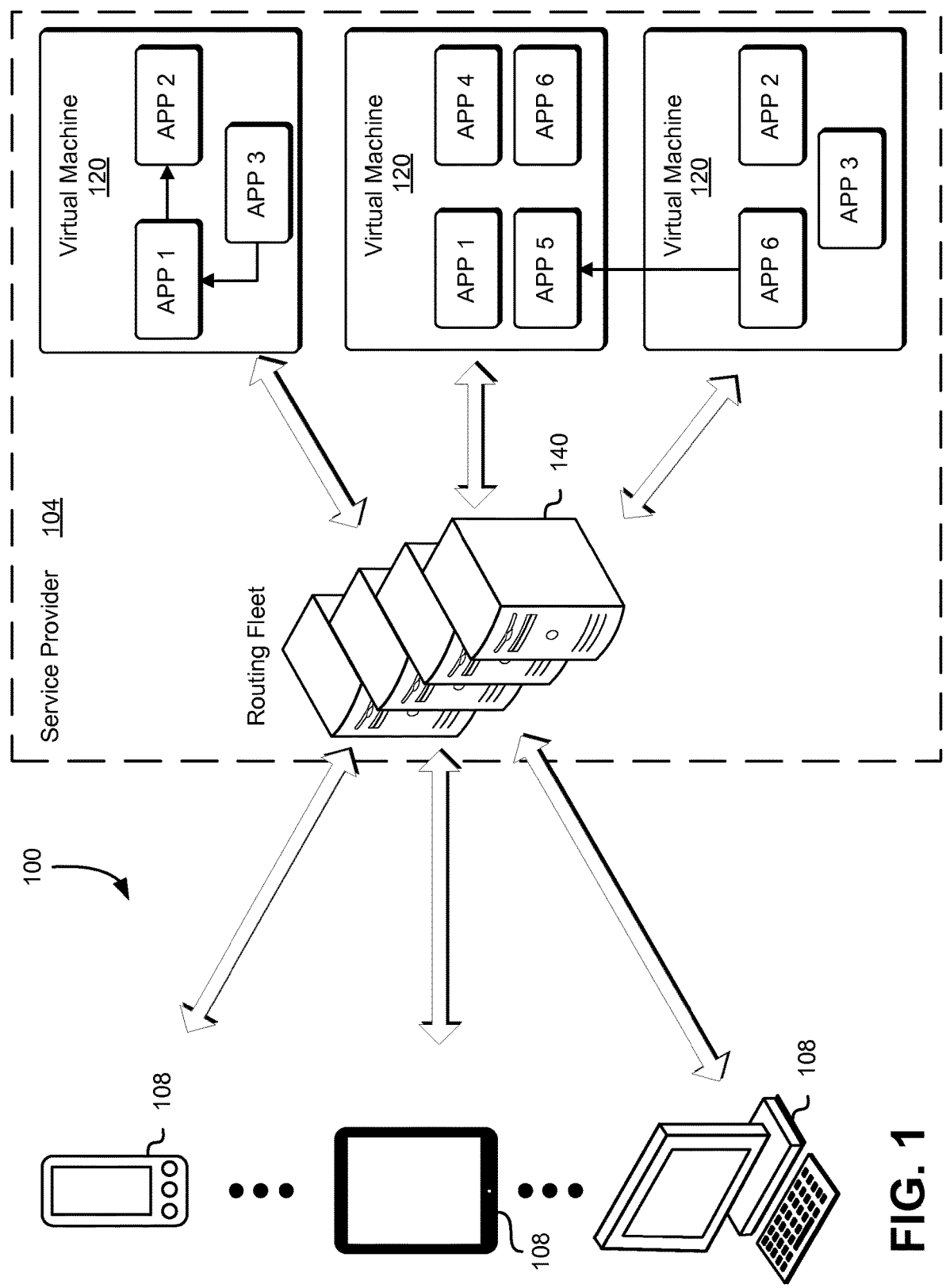
FIG. 1 is a diagram illustrating an environment including a plurality of instances configured to perform operations on behalf of a mobile device in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for mobile devices and applications executed by mobile devices. A mobile device may be associated with a plurality of virtual machine instances referred to herein as a companion virtual machines or companion instances. The companion instance may be used to consolidate traffic emanating from the associated mobile device and received by the associated mobile device. For example, the companion instance may receive notifications on behalf of the mobile device and push the notifications to the mobile device when able to do so. This provides particular utility in situations where the mobile device has an intermittent connection to the Internet or other network. The companion instance may be configured with a stable connection to the Internet or other network the mobile device may receive communications on. In some embodiments, the companion instance may optimize the connection between the mobile device and one or more networks. For example, the companion instance may pool connections between the mobile device in order to handle communication, absorb intermittent connectivity between the devices, and coalesce communication protocol handshakes and other types of connections on behalf of the mobile device.

In some embodiments, data transmitted between the mobile device and the companion instance may be compressed. For example, the companion instance may receive an image on behalf of the mobile device and compress the image to a size optimal for the display of the mobile device. In another example, the companion instance may compress the image as a result of the mobile device being on a slow connection, allowing the mobile device to receive the image sooner. Additionally, the companion instance may perform various operations and/or functions on behalf of the mobile device, for example, the companion instance may automatically follow Hypertext Transfer Protocol (HTTP) redirects. The functions and/or operations performed by the companion instance on behalf of the mobile device may minimize the amount of data sent and received from the mobile device itself, while also conserving battery power of the mobile device by optimizing use of the radio, the processor, the memory, and other portions of the mobile device. Furthermore, the companion instance may provide continuity of communication between the mobile device and other devices, such as a webserver operated by a content provider.

For example, if the mobile device begins to load a webpage of the content provider, and loses connectivity and then re-establishes the connection at some point in time later, the companion instance may maintain the connection during connection loss by the mobile device and eliminate connection time-out artifacts. Various other service and computer systems may communicate with the companion instance without detecting that the mobile device has lost connectivity because the companion instance may receive communications on behalf of the mobile device. The companion instance may, in some embodiments, operate a web server on behalf of the mobile device. Packets and other information transmitted to the mobile device may be routed to the companion instance aggregated and accepted on behalf of the mobile device. This may eliminate the need of the mobile device to poll multiple connections in order to receive notification and other information designated for the mobile device. The companion instance may establish a single connection with the mobile device and transmit all of the data directly to the mobile device over the established connection.

The companion instance may execute a set of applications on behalf of the mobile device aggregating connections between the set of applications and other devices, including other companion instances associated with other mobile devices. For example, a messaging application on a first mobile device may communicate with a second mobile device by causing the companion instance associated with the first mobile device to transmit a message to a second companion instance associated with the second mobile device. Additionally, the companion instance may process data for the mobile device. For example, the mobile device may capture an image using a camera or similar sensor connected to the mobile device, and the mobile device may then transmit the capture image to the companion instance for processing, such as image enhancement or stitching multiple images into a single panoramic image. In some embodiments, a software development kit (SDK) may be exposed to developers in order to enable developers to utilize the companion instance and mobile device as a single entity (i.e., a single logical unit).

For example, a developer may develop a mobile application using the SDK, and the SDK may be configured to determine which portion of the application is executed by the mobile device and which portion is executed by the companion instance based on the capabilities or operation performed by the particular portion of the application. In various embodiments, the developer may indicate which portion of the application is to be executed by the mobile device or companion instance. For example, the developer may tag an application programming interface (API) call or portion of the application as executed by the mobile device or executed by the companion instance. Furthermore, the companion instance or the mobile device may dynamically determine which portions of the application are executed by the companion instance or mobile device. For example, if the mobile device is low on battery power a majority of the processing for an application may be performed by the companion instance.

FIG. 1 illustrates an example environment 100 where one or more mobile devices 108, as well as the associated code running thereon, may be associated with a companion instance 120. Request associated with the one or more mobile devices 108 may include any data transmitted to or from the mobile device 108. This may include network traffic directed to or transmitted from the mobile device 108. The companion instance may execute applications and perform various operations on behalf of the mobile devices 108. The companion instance may be any computer system or virtual computer system configured to execute at least a portion of an application corresponding to an application executed by the mobile device 108. The mobile devices 108 may be any suitable computer system, mobile phone, smartphone, tablet, portable computer or combination thereof capable of communicating with a companion instance 120 through a service provider 104. The mobile device 108 may contain multiple applications in memory. In some embodiments, a single companion instance 120 may be instantiated per mobile device 108. Alternatively, the service provider 104 may provide a fleet of companion instances 120, including multiple Internet Protocol (IP) addresses and a Network address translation (NAT) gateway configured to route traffic to the IP addresses. In this scenario, each mobile device 108 may be assigned a particular IP address and traffic for the particular mobile device 108 may be directed to the corresponding companion instance 120 based at least in part on information provided by the NAT gateway.

The service provider 104 may operate system hardware 140, described in greater detail below, used to execute the companion instances 120 and enable communication between the mobile device 108 and the companion instance 120. For example, the system hardware 140 may include a routing fleet configured to receive network traffic, such as requests, associated with the mobile device 108 and direct the network traffic to the appropriate companion instance 120. Furthermore, the routing fleet may direct traffic to a particular companion instance or set of companion instances based at least in part on a geographic location associated with the request. The companion instance may execute one or more applications on behalf of the mobile device 108. Furthermore, the companion instance 120 may have a present power supply due to the system hardware that is executing the companion instance 120 being connected to the power grid. In some embodiments, the mobile device 108 and the companion instance 120 may each execute a copy of the applications and the applications may transmit data used during execution of the application between the mobile device 108 and the companion instance 120. Additionally, separate applications may communicate between each other while being executed by the companion instance. For example, a messaging application executed by the companion instance 120 may communicate with a photo gallery application executed by the companion instance 120.

Application executed by the companion instance 120 may also transmit data to one or more other companion instances 120. For example, the messaging application discussed above may transmit a message directly to one or more other companion instances 120 associated with a mobile device 108. The companion instance 120 may enable the recipient mobile device 108 to receive the message without requiring the recipient mobile device 108 to be connected to a network. In some embodiments, an agent application, described in greater detail below, may be used to facilitate the transmission and reception of notifications between the mobile device 108 and the companion instance 120. For example, the companion instance 120 may receive a message on behalf of the mobile device 108 and transmit a notification of the received message to the mobile device 108. At some point in time later, the mobile device 108 may obtain the message from the companion instance 120. Additionally, the companion instance 120 receiving a message and/or notification may update a database with information corresponding to the message and/or notification. The information corresponding to the message and/or notification may enable other companion instances or other applications executed by companion instances to obtain the message and/or notification or determine that the message and/or notification has been received. In some embodiments, the agent application may provide data corresponding to the state of the mobile device 108 and/or information collected by one or more sensors of the mobile device 108. For example, the agent may transmit GPS coordinates and accelerometer data to the companion instance 120. The companion instance 120 may perform a variety of operations based at least in part on the received information. For example, the companion instance 120 may notify another companion instance or other service provider that the mobile device is in a particular location.

Furthermore, request routing and fulfilment may be different based at least in part on various attributes of the requestor and the companion instance being accessed. For example, the routing fleet may direct the request to a particular companion instance based at least in part a geographic location associated with the requestor, demographic information associated with the requestor, advertising information associated with the requestor, or any other information suitable for routing a request. For example, information associated with the requestor may indicate that the requestor likes a Beijing, the routing fleet may direct request associated with the requestor to a particular companion instance with photo's capture by the customer's mobile device while in Beijing. Additionally, request may be routed to particular companion based at least in part on information requested. For example, a request may be directed to a particular companion instance based at least in part a particular video the request is attempting to access.

Figure 2:
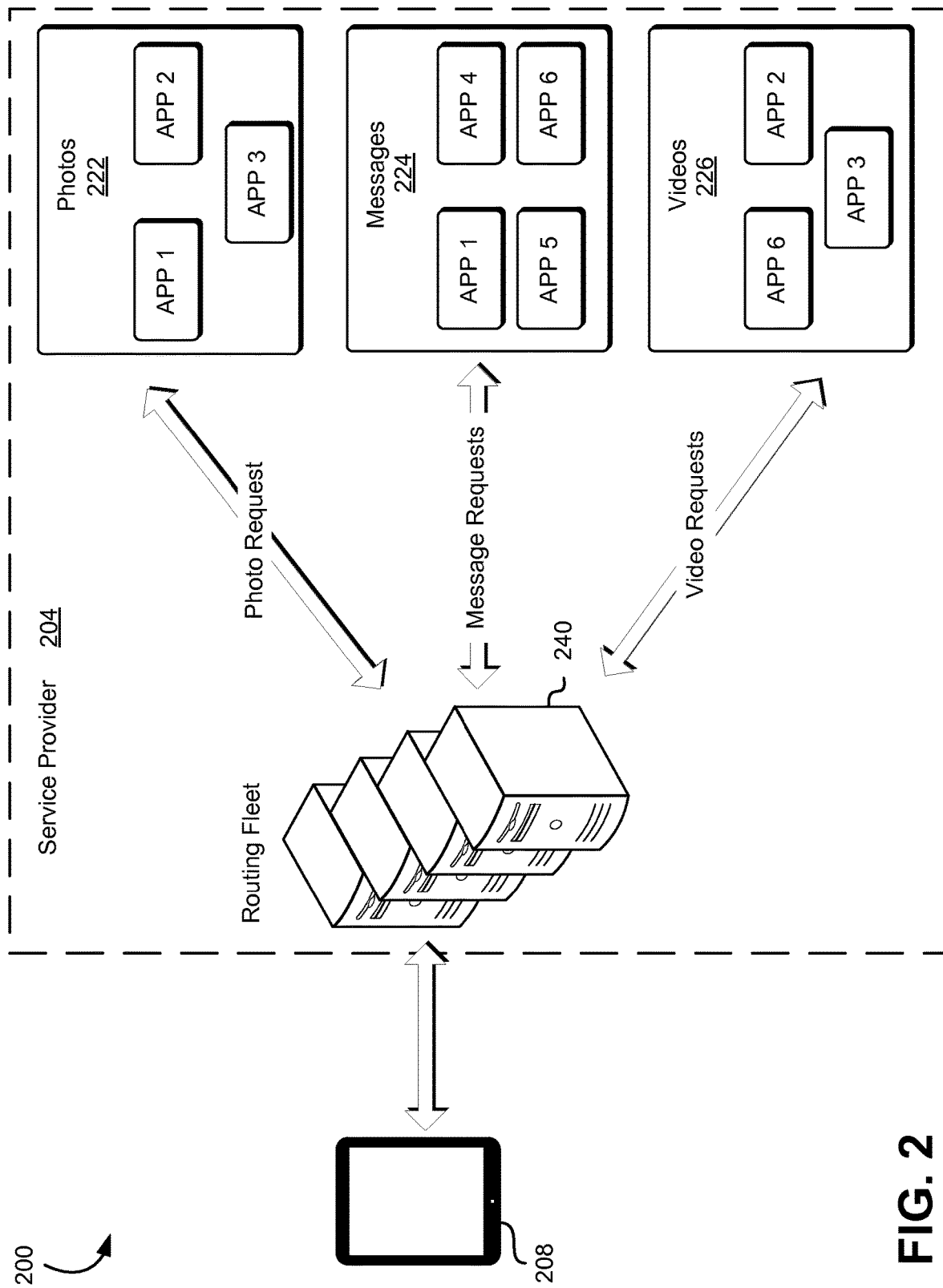
FIG. 2 is a diagram illustrating an environment including a plurality of instances configured to perform operations on behalf of a mobile device in accordance with at least one embodiment.

FIG. 2 illustrates an example environment 200 where one or more mobile devices 208 owned and/or associated with a single customer, as well as the associated code running thereon, may be associated with a plurality companion instances. Each companion instance may manage a particular type of network traffic and/or data object on behalf of the customer. As illustrated in FIG. 2, the plurality of companion instances may include a companion instances associated with photos 222, a companion instance associated with messages 224, and a companion instance associated with videos 226. Network traffic associated with the customer's photos or photos captured by the customer's mobile device may be directed to the companion instances associated with photos 222 for processing. In various embodiments, a computing resource 204 service provider or component thereof such as system hardware 240, may detect a trigger and load at least a component of an application into memory of a companion instance. The triggers may include consumption of an application by the mobile device 208 (e.g., obtaining a component of the application by the mobile device through an application market place, described in greater detail below), receiving a request associated with a particular data type, determining that the current capacity (e.g., storage or processing capacity) of the companion instances currently associated with the mobile device is insufficient, customer request for additional companion instances, or any other trigger indicating that additional companion instance may be used to process and/or fulfill a received request.

A service provider 204 may provide a variety of services to the customer and the customer may communicate with the service provider 204 via an interface executed by the system hardware 240, which may be a web services interface or any other type of customer interface. The customer may be an organization that may utilize one or more of the services provided by the service provider 204 to maintain and deliver information to its employees, which may be located in various geographical locations. For example, the organization may provide employee with a mobile device to enable communication between the various geographic locations the organization operates. Additionally, the customer may be an individual that utilizes the services of the computing resource service provider. The customer may communicate with the service provider 204, using the mobile device 208, through a network, whereby the network may be a communication network, such as the Internet, an intranet or an Internet service provider (ISP) network. Some communications from the customer to the service provider 204 may cause the service provider 204 to operate in accordance with one or more embodiments described herein or a variation thereof.

For example, the customer may, using the customer's mobile device 208, execute an application which may cause the service provider 204 to instantiate a companion instance on behalf of the customer. As illustrated in FIG. 2, the customer may be given a single companion instance associated with one or more of the customer's mobile devices 208. For example, the customer may register one or more mobile devices with the service provider 208, and the registration process may associate the companion instance 120 with the registered mobile devices 108. The companion instance 120 may provide synchronization between the one or more mobile devices 208 owned by the customer. For example, the customer may modify the parental control settings for a particular application using a first mobile device 108. The companion instance may then cause the modification of the parental control settings to be applied to one or more other mobile devices 208 registered with the customer's account. Additionally, the customer may access one or more of the customer's mobile devices 208 from another device. For example, the customer's smartphone may not have enough battery power or otherwise may have been rendered inoperable, and the customer may access the applications and other data contained on the smartphone by using another computer system connected to the companion instance 120.

In some embodiments, the companion instance may execute software and other applications on behalf of the mobile device 208 and the mobile device 208 may execute a receiver application configured to connect to the companion instance and render the state of the companion instance on a display device connected to the mobile device 208. The companion instance may enable communication between one or more applications executed by the companion instance or one or more other companion instances as described above in connection with FIG. 1. In some embodiments, the companion instance may be configured to alert an operator of a first mobile device of an activity of a second mobile device 208. For example, the customer may access a video streaming application on the customer's tablet and may receive a notification on the tablet from the companion instance that the customer's smartphone is attempting to access the same or a different application. The companion instance may enable the customer to notification corresponding to the activity of the customer's mobile devices 208 and enable the customer to determine access policies of the customer's mobile devices 208. For example, the customer may allow the customer's smartphone to access all of the application executed by the companion instance but may restrict certain application from executing on customer's tablet, which may be frequently utilized by children.

Figure 3:
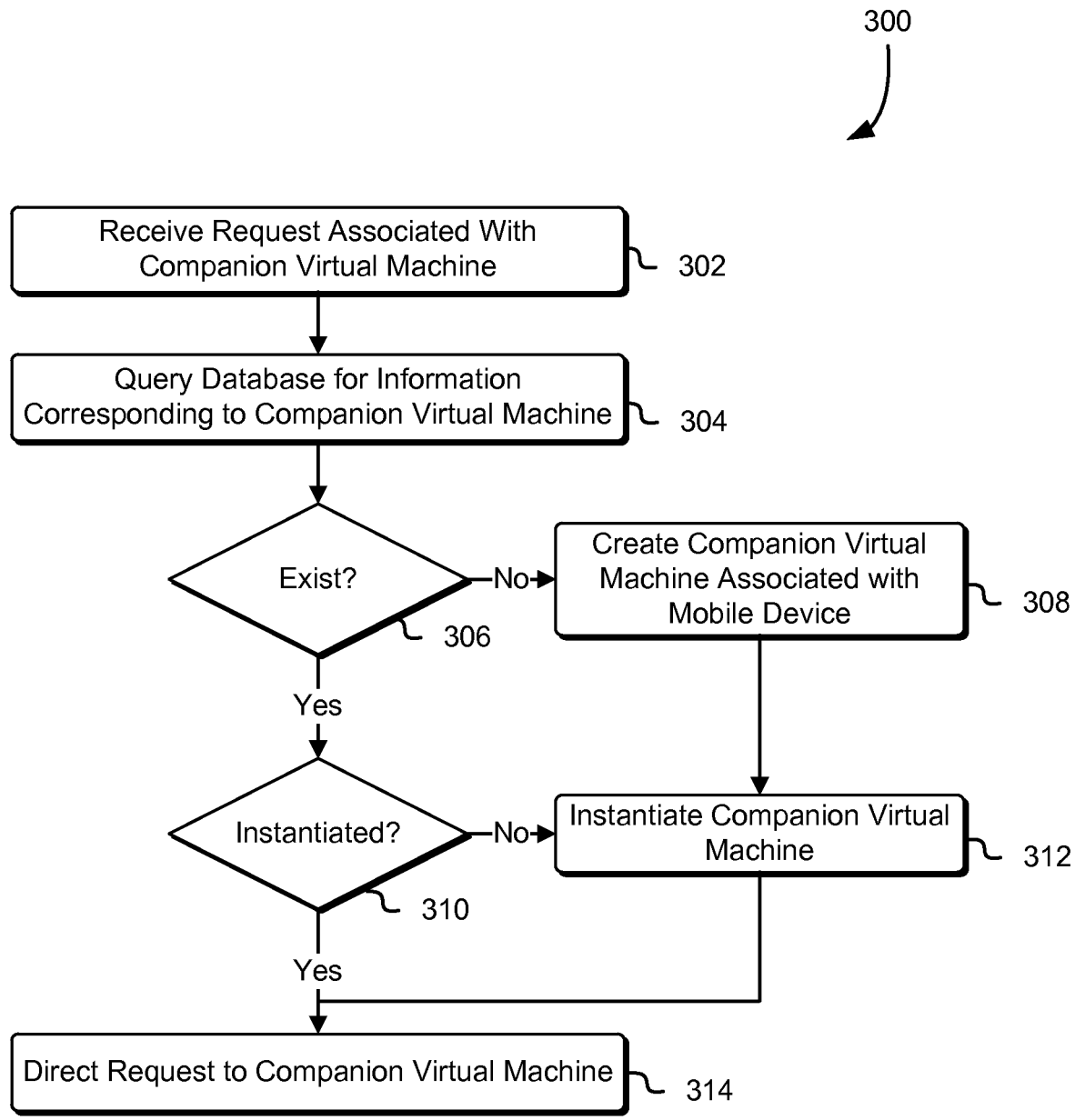
FIG. 3 is an illustrative example of a process for providing a plurality of instances for an instance-backed mobile device in accordance with at least one embodiment.

FIG. 3 shows an illustrative example of the process 300 which may be used to enable communication between a mobile device and corresponding companion instance. The process 300 may be performed by any suitable system such as the virtual machine management service described below in connection with FIG. 6. Returning to FIG. 3, in an embodiment, the process 300 includes receiving a request associated with a companion instance 302. The request may be generated by the mobile device as a result of receiving an input from a customer, such as performing an operation utilizing an application supported by a companion instance. For example, the mobile device may include a media capture application supported by a companion instance, and the customer may cause the media capture application to perform an operation supported by the companion instance, such as rendering a video. The mobile device executing the media capture application may then transmit a request to the companion instance to perform at least a portion of the video rendering.

The computer system executing process 300 may then query a database for information corresponding to the companion instance 304. For example, the virtual machine management service may query the database, as described above, in order to determine the status of the companion instance. The information corresponding to the companion instance may include whether the companion instance exists 306. If the companion instance does not exist, the computer system executing process 300 may cause the companion instance associated with the mobile device to be created 308. The companion instance may be created as described above.

Returning to process 300, if the companion instance exists the computer system executing process 300 may then determine if the companion instance is currently instantiated 310. If the virtual machine is not instantiated, the computer system executing process 300 may then cause the companion instance to be instantiated 312. In some embodiments, the service provider or virtual machine management service may be configured to terminate or otherwise un-instantiate a companion instance when not used by the mobile device. The companion instance may therefore be instantiated in order to process the request. Once the companion instance has been instantiated the process 300 may continue and the computer system executing process 300 directs the request to the companion instance.

Figure 4:
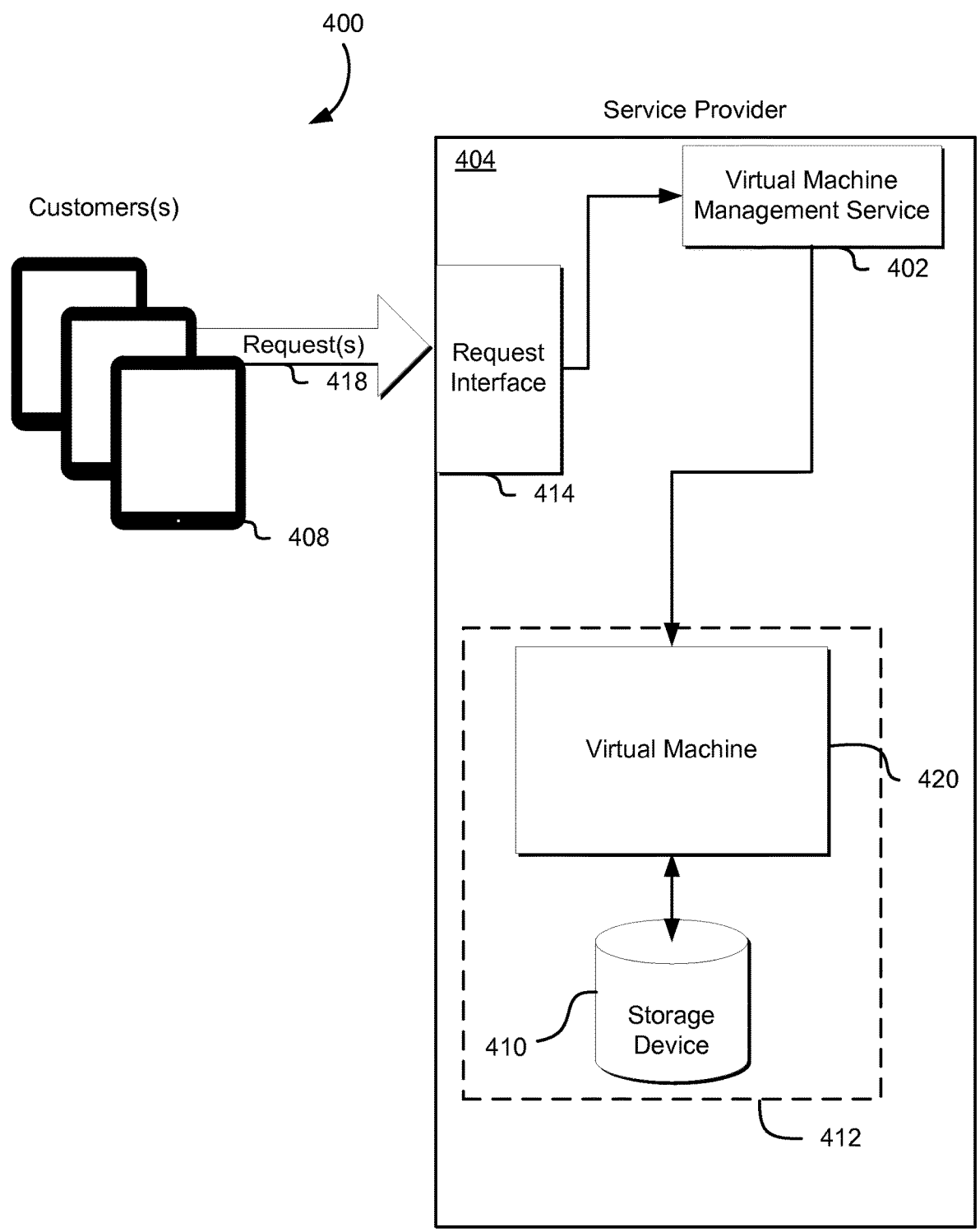
FIG. 4 is a diagram illustrating an environment for communicating with a plurality of instance configured to perform operations on behalf of a mobile device in accordance with at least one embodiment.

FIG. 4 shows an example 400 of customers sending requests to a service provider 404 to interact with a companion instance 420. The computing resource service provider 404 may provide a companion instance 420 in order to support the operation of a mobile device 408. The customer may send requests 418 to the service provider 404 over a network, such as the Internet, and the request may be generated by the mobile devices 408. The request 418 may be appropriately configured API calls generated by the mobile device 408 or application thereof such as an agent application described in greater detail below. In various embodiments, the requests 418 are received by a request interface 414 operated by the service provider 404. The request interface 414 may direct the request to the appropriate system, such as the virtual machine management service 402 shown in FIG. 4. As requests 418 are received by the request interface 414, information corresponding to the requests may be used to route the request 418 to the appropriate service and/or system. The request interface 414 may be a web server, a virtual machine instance, or may be a container instance as described in greater detail below in connection with FIG. 7. In some embodiments, the request interface 414 may query the virtual machine management service 402 to determine a location of the companion instance 420 included in the request 418 and transmit the request 418 directly to the indicated companion instance 420. In various embodiments, the virtual machine management service 402 may manage the operation of one or more companion instances 420. While FIG. 4 shows one request interface 414 for the service provider 404, each service of the service provider 404 may operate an interface and, generally, subsets of the services may have corresponding interfaces in addition to or as an alternative to the request interface 414.

Returning to FIG. 4, the companion instance may execute in a container 412 or may otherwise be segregated such that communication between the companion instance 420 and other systems of the service provider is limited. Additionally, the companion instance may include a storage device 410, and the storage device may be on-demand data storage, block-level storage, or any other suitable data store or virtualization thereof. The storage device 410 may be utilized to store information on behalf of the mobile device 408. For example, the companion instance 420 may be configured to back up data generated by the mobile device 408 or data generated by the companion instance 420 on behalf of the mobile device 408.

Figure 5:
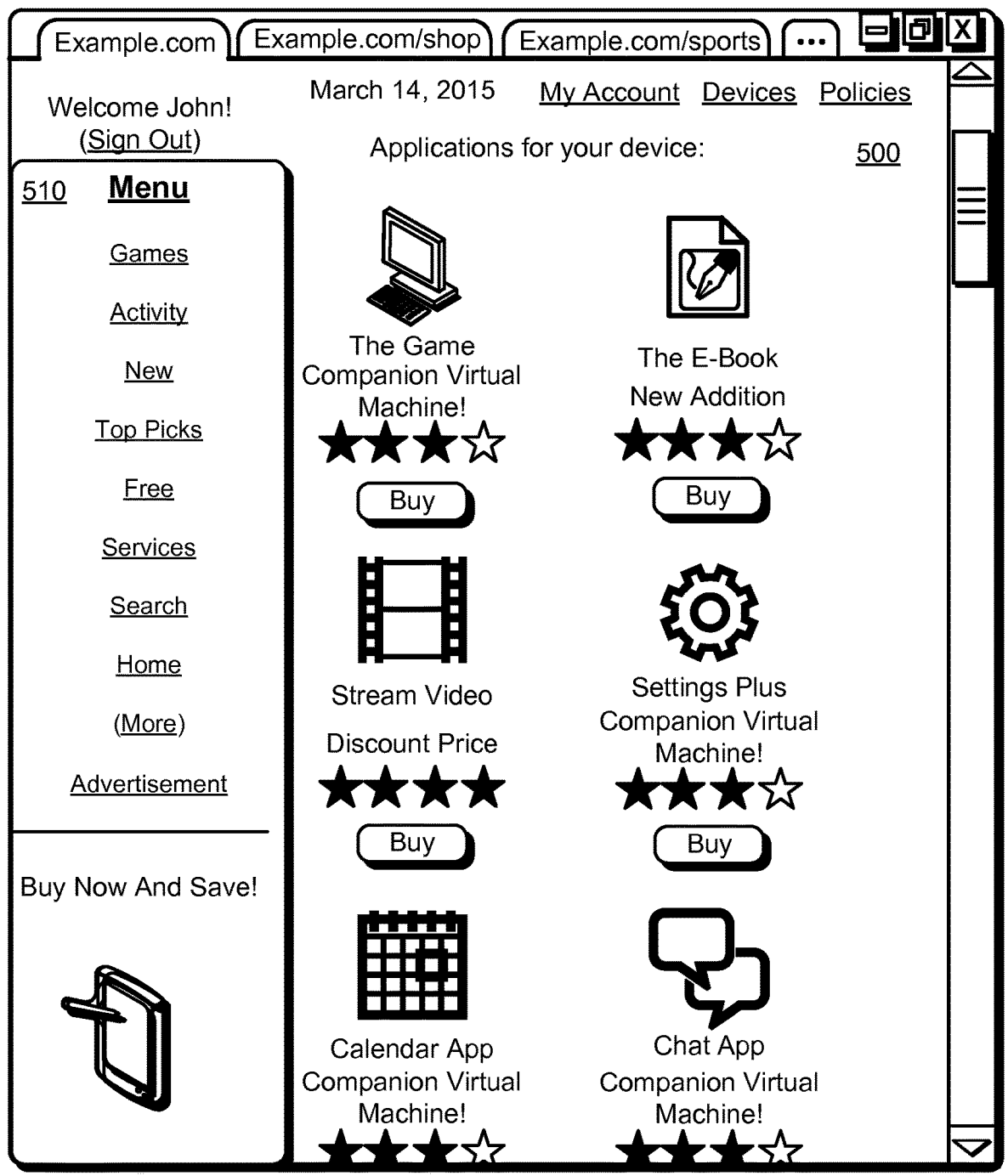
FIG. 5 is an illustrative example of a webpage for consuming instance-backed applications in accordance with at least one embodiment.

FIG. 5 shows a webpage 500, which may be displayed by an application executed by a mobile device enabling a customer to purchase or otherwise obtain one or more applications supported by a companion container instance. As illustrated in FIG. 5, the webpage 500 includes various graphical user interface elements that enable navigation throughout a mobile application store of which the webpage 500 is a part. In various embodiments, the webpage 500 is implemented by a service provider and the service provider is responsible for receiving customer input into the webpage 500 and transmitting the received input to various other services of the service provider configured to instantiate a companion container instance associated with the application or otherwise possess the customer's input. For example, as described in greater detail below, the customer's input may cause the service provider to enable the customer's mobile device and an associated companion instance and/or companion container instance to access an application and associated data in order to install the application on the mobile device and the companion container instance. As a result of this association between the companion instance and the customer's mobile device, the customer may be provided with a centralized location (e.g., one or more storage locations accessible to the companion instance) suitable for storage the data associated with the customer and/or applications executed by the customer. For example, the computing resource service provider may operate a central repository configured to store data associated with the customer on behalf of the customer. Customer data from various devices may be stored in the central repository and may be accessible to various applications executed by the customer's mobile device. The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to the application store. In this example, the links appear as textual words, which enable the links to be selected using an appropriate input device such as a keyboard, mouse, touchscreen or other input device. Selection of one of the links 510 may cause an application displaying the webpage 500 to submit, pursuant to a uniform resource locator (URL) associated with the selected link by the programming of the webpage 500, an HTTP request for the content associated with the link to a server that provided the webpage 500 or another server. In this example, the webpage 500 also includes a graphical user element configured as a "buy" button. The buy button may be a graphical user interface element of the webpage 500 where the underlying code of the webpage 500 is configured such that selection by an input device of the buy button causes information corresponding to the selection to be transmitted to one or more servers of the service provider.

The webpage 500 may also include a description of the applications and/or other information associated with the applications displayed in webpage 500. The description may provide information to the customer including whether the application is associated with a companion container instance. In some embodiments, the mobile device may be provided with a companion container instance when an application or particular application is consumed from the application store. For example, a companion container instance may be instantiated and associated with the customer mobile device once the customer has downloaded and/or installed an application of the customer's mobile device that is supported by a companion container instance. In this example, the webpage 500 contains six applications that the customer may download and/or provide to the customer's mobile device. The applications may be provided by a developer, by the service provider, or any other party capable of posting application to the webpage 500. The executable code of the application may indicate whether the application utilizes a companion container instance.

Furthermore, the applications displayed in the webpage 500 may correspond to services offered by the service provider or one or more other organizations. For example, the services may include a messaging, delivery service, or other service. The applications displayed on the webpage 500 may contain a presentation of the application such as a graphical representation of the service or operation associated with the application, which could be text and/or a drawing, photograph, description, identification number, trademark, video clip, audio clip, or any other representation capable of representing the items. Other variations of the user interface displayed in FIG. 5 may be used in accordance with the present disclosure. For example, drop-down menus may be included in the user interface to enable the user to select a particular user account or information associated with a customer account to include when provisioning new mobile devices.

Figure 6:
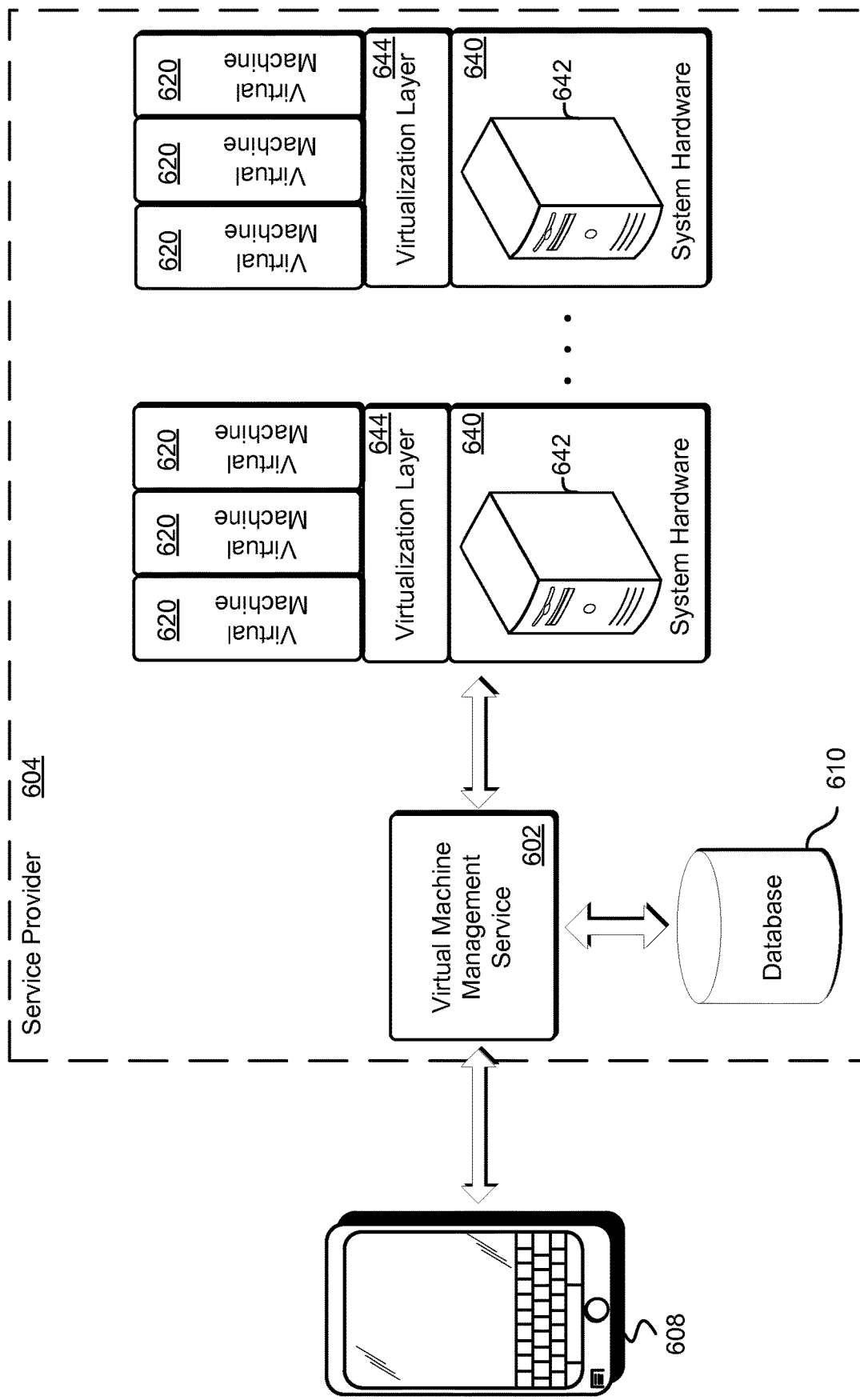
FIG. 6 is a diagram illustrating an environment for distributing applications to instance-backed mobile devices in accordance with at least one embodiment.

FIG. 6 illustrates an environment 600 in which a virtual computer system service is providing companion instances for mobile devices in accordance with at least one embodiment. The virtual computer system service, which may be system hardware 640, is used by a service provider 604 to provide computational and other resources for mobile devices. The system hardware 640 may include physical hosts 642. The physical hosts 642 may be any device or equipment configured to execute instructions for performing data computation, manipulation or storage tasks, such as a computer or a server. A physical host 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 240 may also include storage devices, such as storage disks and tapes, networking equipment and the like.

A virtualization layer 644 executing on the physical host 642 enables the system hardware 640 to be used to provide computational resources upon which one or more companion instances 620 may operate. For example, the virtualization layer 644 may enable a companion instance 620 to access system hardware 640 on the physical host 642 through virtual device drivers on the virtual machine 620. Furthermore, physical host 642 may host multiple companion instances 620 of the same or different types on the same system hardware 640. The companion instances 620 may be any device, software or firmware used for providing a computing platform for the mobile device 608. For example, the companion instance may, in some embodiments, be implemented as a physical computer system configured to perform operations on behalf of the mobile device 608. Furthermore, the companion instance 620 may be generated and/or instantiate as a result of the mobile device 608 completing a boot operations.

The virtual computing platform may include various virtual computer components, such as one or more virtual CPUs, virtual memory and the like. The companion instances 620 may be provided to the customers of the service provider 604 and the customers may run an operating system or an application on the virtual machines 620 in support of the mobile device 608. Further, the service provider 604 may use one or more of its own virtual machines 620 for executing its applications, such as the application management service described above.

In some embodiments, the mobile device 608 may communicate with the corresponding companion instance through the virtual machine management service 602. For example, the mobile device may transmit commands and other information to the virtual machine management service, and the commands may indicate operations to be performed by the companion instance. The commands and other information may be included in an API call from the virtual machine management service 602 to the companion instance 620. The virtual machine management service 602 may enable the mobile device 608 to manage and operate the companion instances 620.

For example, the mobile device 608 may transmit a request to the virtual machine management service 602 to have the companion instance 620 process an image. The request may be an API call, including information corresponding to the image and the companion instances 620. The virtual machine management service 602 may determine the corresponding physical host 642 for the companion instances 620 included in the request and transmit the image and/or request to the companion instance 620. The virtual machine management service 602 may maintain a database 610 with one or more records containing information corresponding to the companion instances 620. For example, the database 610 may contain a Domain Name System (DNS) entry indicating an IP address useable for communicating with a particular companion instance 620. Returning to the example above, the virtual machine management service 602 may receive a request, from the mobile device, to interact with the corresponding companion instance 620. The virtual machine management service 602 may locate the companion instance 620 in the database 610 and transmit the request to the companion instance 620.

In another example, the request from the mobile device may include a request to instantiate a companion instance 620. The virtual machine management service 602 may then determine a physical host 642 capable of executing the companion instance 620 on system hardware 640. The virtual machine management service 602 may then send the command to instantiate the companion instance 620 to virtualization layer 644 on the determined physical host 642. The virtualization layer 644 may then instantiate the companion instance 620. The virtualization layer 644 may then return information corresponding to the companion instance 620 to the virtual machine management service 602 and the virtual machine management service 602 may record at least a portion of the information in the database 610. For example, the virtualization layer 644 may return location information corresponding to the companion instance 620 which may then be stored in a record in the database associated with the mobile device 608.

Figure 7:
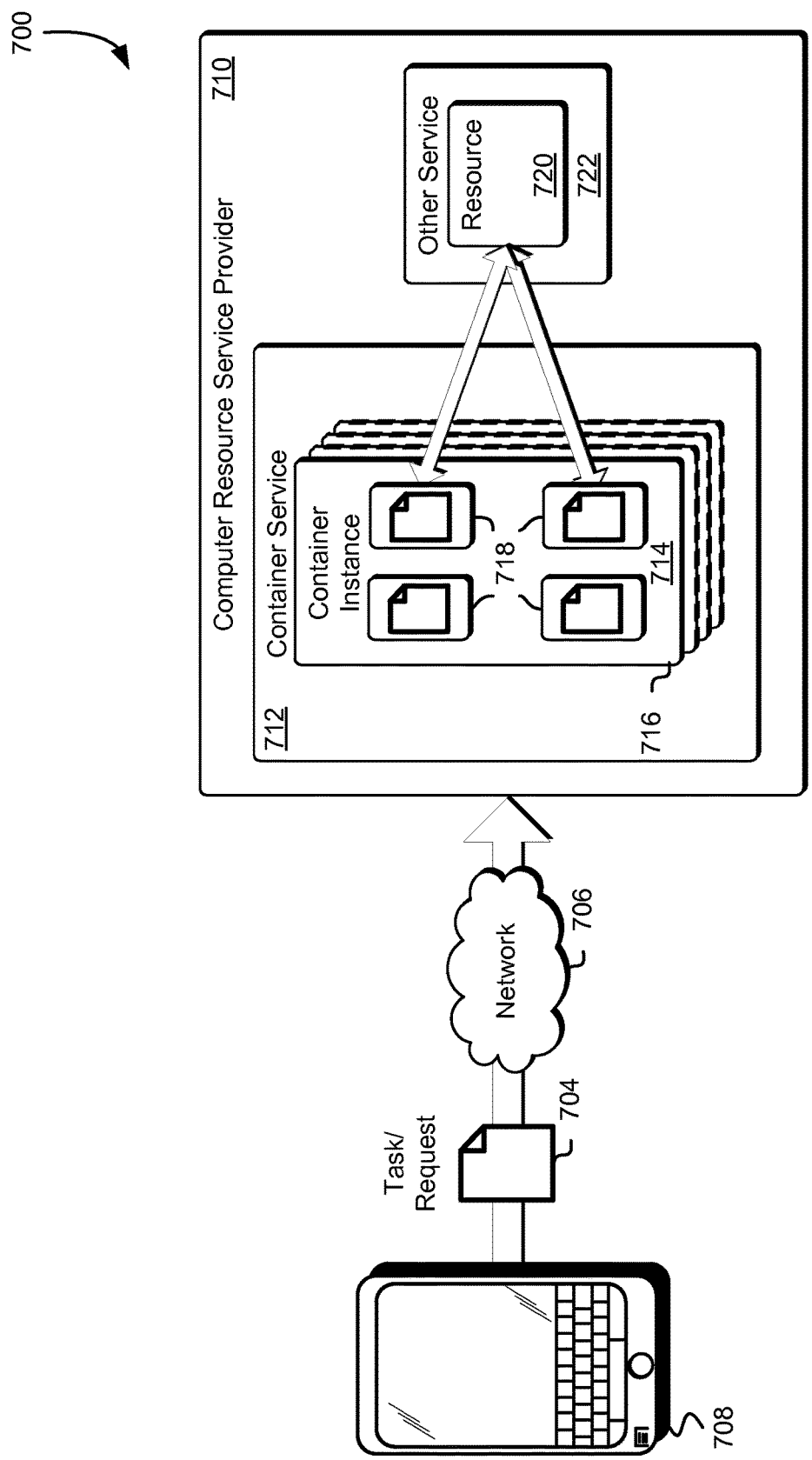
FIG. 7 illustrates an example of a customer's mobile device interacting with a container service in accordance with an embodiment.

FIG. 7 illustrates an aspect of an environment 700 in which an embodiment may be practiced. As illustrated in FIG. 7, the environment 700 may include a customer's mobile device 708 that sends a task definition file 704 for software containers 718 along with a request to launch tasks through a network 706 to a container service 712 of a computing resource service provider 710. A scheduler, such as the scheduler described in greater detail below in connection with FIG. 7, may determine into which container instance 714 of a cluster 716 of container instances that the software containers 718 specified in the task definition file 704 should be launched. In some embodiments, the software containers 718 may be configured to share resources 720 provided by other services 722 of the computing resource service provider 710, such as a storage volume provided by a block-level data storage service of the computing resource service provider 710. Furthermore, the software containers 718 may corresponded to functions of an application where at least a portion of the application is executed by the customer's mobile device. For example, the customer may select an application for installation and/or execution from an application marketplace as described above in connection with FIG. 5. The selected application may comprises at least a portion of the application to be executed by the customer's mobile device and a set of software containers 718 corresponding to functions and/or operation of the application executed using resources of the computing resource service provider 710.

The mobile device 708 may be any suitable computer system, mobile phone, smartphone, tablet, portable computer or combination thereof capable of communicating with the container service 712 through a service provider 710. The mobile device 708 may contain multiple applications, task 704, and software containers in memory. In some embodiments, a single companion container instance 714 may be instantiated per mobile device 708. Alternatively, the service provider 710 may provide a fleet or cluster of companion container instances 716 including multiple Internet Protocol (IP) addresses and a Network address translation (NAT) gateway configured to route traffic to the IP addresses. In this scenario, each mobile device 708 may be assigned a particular IP address and traffic for the particular mobile device 708 or may be directed to the corresponding companion container instance 714 of the cluster 716, based at least in part on information provided by the NAT gateway. In various embodiments, the container service 712 or other service 722 may contain the task and/or software container to be executed by the container instance 714 on behalf of the mobile device 708. In such embodiments, the mobile device 708 may transmit a request to the computing resource service provider to execute one or more tasks and/or software containers indicated in the request.

Furthermore, the resources of the mobile device 708 may be made available to other users and/or devices. For example, the mobile device 708 may utilize the container instance 714 to provide a virtual presence for other users, and these other users may then interact with the mobile device 708 through the virtual presence provided by virtual presence through the container service 712. The container instance 714 or particular software containers 718 of the container instance 714 may utilize various permissions to access the other resources 720. The permission may be inherited from the customer or may be granted by another customer. For example, the customer may access the resources 720, such as photos capture by another customer's mobile device, through the container instance 714 using permission associated with the customer. In another example, a container instance 714 or software container 718 associated with another customer may assign permissions to the resources 720 enabling the customer to access the resources 720 through the customer's container instance based at least in part information associated with the resources 720. The information associated with the resources 720 may include one or more attributes of the resource 720 or information included in the resource 720. For example, the resources 720 may include a set of photos, the container instance 714 or software container 718 associated with the other customer may perform facial recognition operations on the set of photo and assign permissions granting access to the photo based at least in part on the customer's faces recognized during the facial recognition operations. The mobile device 708 may communicate with the container service 712 of the computing resource service provider 710 through the network 706, which may be a communication network, such as the Internet, an intranet, an internet service provider (ISP) network and/or some other such network as described below.

In some examples, a "task definition" or "task definition file" may refer to a file specifying a set of linked containers (i.e., a set of containers that, when running on a host computing system, are associated with each other) that are assigned to start as a group. The task definition file 704 may further specify disk and network locations that the software containers 718 are able to share on a single physical machine. The task definition file 704 may then be utilized for launching the set of containers 718. In some implementations, the task definition file 704 may define and link software containers 718 spread across multiple physical machines. One task definition file 704 may contain and schedule many tasks. In some examples, a "task" may refer to an instantiation of a task definition file 704, and may consist of one or more software containers 718. Tasks may be modified by applying a new task definition to the task.

The task definition file 704 may contain all the information needed to place software containers 718 in containers 714 of a cluster 716, and the cluster 716 may be managed through application programming interface calls.

An example of a task definition may be:

```
{'db':
{
  'Image': 'forest/postgresql',
  'Ports': ['5432'],
  'CPU': 1000,
  'Memory': 1073741824
},
'web':
{
  'Image': 'hub.web.com/rails:latest',
  'Ports': ['8000:8000'],
  'links': ['db'],
  'CPU': 1000,
  'Memory': 1073741824
}
}
```

The example task definition specifies that a first task, entitled "db," has a software image located at the path "forest/postgresql." The first task is allocated processing capacity of 1,000 and 1 gigabyte of memory, and the first task uses port 5432. Similarly, the task definition also specifies that a second task, entitled "web," has a software image located at the path "hub.web.com/rails:latest." The second task is allocated processing capacity of 1,000 and 1 gigabyte of memory, and the second task uses ports 8000: 8000. The task definition notes that the second task ("web") is allowed to link to the first task ("db").

The container service 712, described in greater detail below in connection with FIG. 2, may be a service provided by the computing resource service provider 710 to allow the mobile device 708 to execute the containers 718 within the cluster 716. The computing resource service provider 710, described in greater detail below, may provide one or more computing resource services to its customers individually or as a combination of services of a distributed computer system. The one or more computing resource services of the computing resource service provider 710 may be accessible over the network 706 and may include services such as virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

The mobile devices 708 supported by the container service 708 of the computing resource service provider 710 may communicate with one or more of the services, including the container service, via an interface, which may be a web services interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running an operating system) that is configured to launch and run software containers 718. Thus, the container instance 714 may be configured to run the software containers 718 within the container instance 714 in accordance with the task definition file 704 provided by the mobile device 708 or other entity, such as a software developer, described above. One or more container instances 714 may comprise a cluster 716. In some examples, "cluster" may refer to a set of one or more container instances 714 that have been registered with the cluster, described in greater detail below in connection with FIG. 2. Thus, the container instance 714 may be one of many different container instances 714 registered with the cluster 716, and the other container instances of the cluster 716 may be configured to run the same or different types of software containers 718 as the container instance 714. The container instances 714 within the cluster 716 may be of different instance types or of the same instance type, and the mobile device 708 may have access to or interact with more than one cluster 716. Thus, the mobile device 708 may launch one or more clusters 716 and then manage user and application isolation of the software containers 718 within each cluster 716 through application programming interface calls.

A software container 718 may be a lightweight virtualization instance running under a computer system instance that allows processes and data used by the processes within the software container 718 to be isolated from other processes running in the same computer system instance or container instance 714. Thus, the software containers 718 may each be virtualization instances running under an operating system of the container instance 714 and executing in isolation from each other. Each of the software containers 718 may have its own namespace, and applications running within the software containers 718 are isolated by only having access to resources available within the container namespace. Thus, software containers 718 may be an effective way to run one or more single applications within their own namespace. A container encapsulation system allows one or more software containers 718 to run within a single operating instance without overhead associated with starting and maintaining virtual machines for running separate user space instances. An example container encapsulation system is the Docker container engine.

The software containers 718 may be launched to have only specified resources from resources allocated to the container instance 714; that is, a software container 718 may be launched to have a certain amount of memory and to not utilize more than a specified amount of processing power. The resource allocation for the software containers 718 may be specified in the task definition file 704. Multiple software containers 718 may be running simultaneously on a single host computer or host container instance, and the resources of the host can be allocated efficiently between the software containers 718, container instances 714, and/or clusters 716 of container instances 714. In some embodiments, a host may support running software containers 718 in container instances 714 from only one mobile device 708. In other embodiments, a single host may allow multiple mobile devices 708 to have container instances 714 running on the host. In the latter case, the container service 710 may provide security to ensure that the mobile devices 708 are unable to access containers, clusters, or container instances of the others.

Different types of tasks may have different resource requirements and may have different lifespans. Thus, the software containers 718 may be dynamically scheduled to run by a scheduler service in the container service 710 independent of an underlying operating system of the container instance 714, and as such, the underlying operating system of the container instance 714 may be very basic. Alternatively, the containers 718 may be scheduled to run by a scheduler installed within the container instance 714 of the cluster 716.

The other services 722 may be services such as services described above of the computing resource service provider described in greater detail below. Likewise, the other resources 720 may include resources that can be shared between virtualized instances, such as a storage volume of a block-level data storage service.

Figure 8:
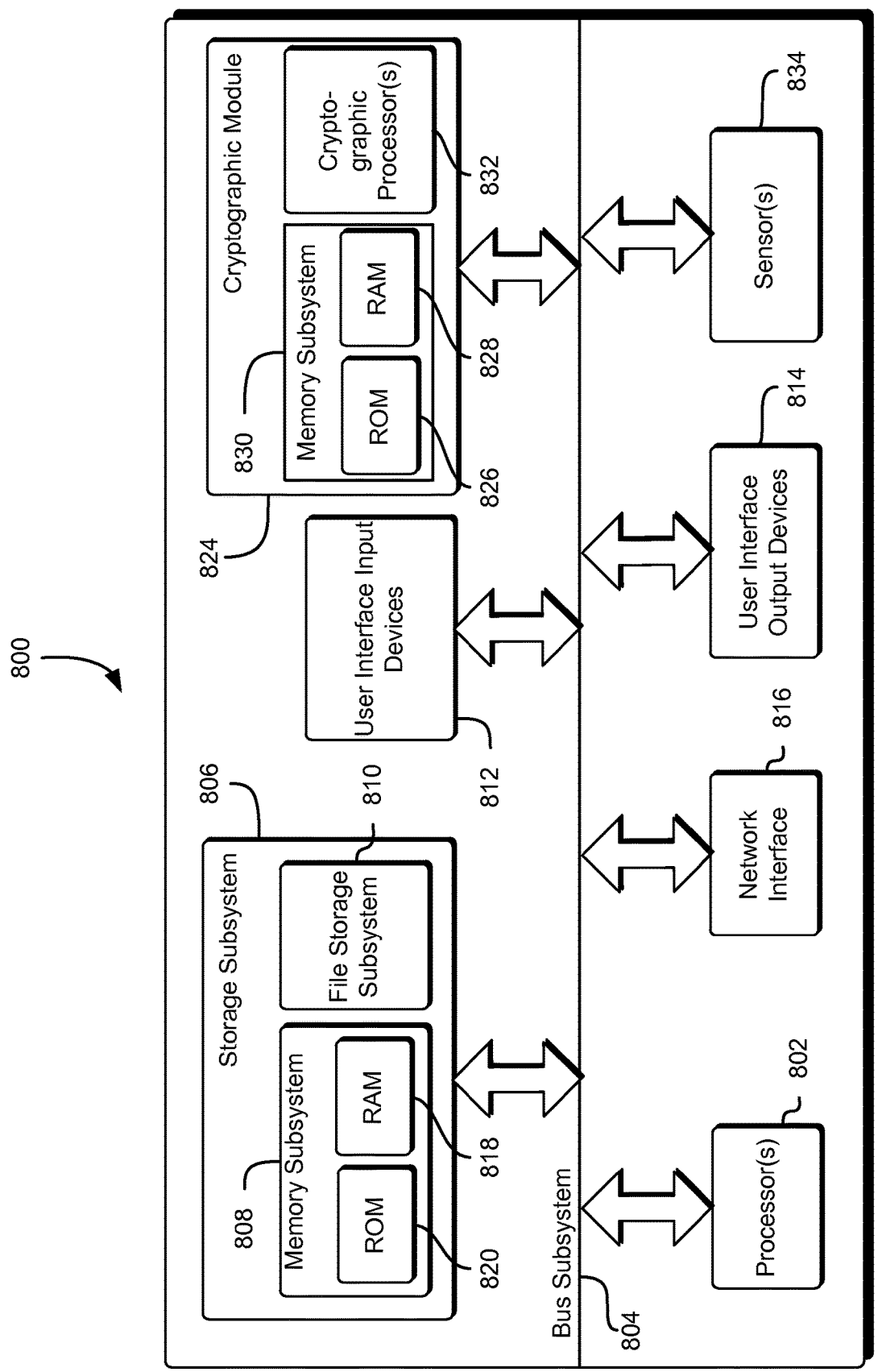
FIG. 8 shows an illustrative example of components of a computing device in accordance with at least one embodiment.

FIG. 8 is an illustrative, simplified block diagram of an example mobile device 800 that may be used to practice at least one embodiment of the present disclosure. In various embodiments, the device system 800 may be used to implement any of the systems illustrated herein and described above. For example, the device system 800 may be used to implement a mobile device and other applications, such as a browser application, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, one or more user interface output devices 814, a network interface subsystem 816, a cryptographic module 824, comprising a memory subsystem 830, and one or more cryptographic processors 832. The peripheral subsystems may also include one or more sensors 834 in addition to sensors of input devices 812. Such sensors may include, but are not limited to, GPS sensors, accelerometers, temperature sensors and others.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of application data and other information, such as electronic requests, to access a system (e.g., receive a webpage) and may enable receipt of responses to the requests, such as webpages or other information. The network interface subsystem 816 may also facilitate the receipt and/or transmission of data on other networks, such as an organization's intranet and/or other networks described below.

The user interface input devices 812 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 800.

User interface output devices 814, if any, may include a display subsystem, or non-visual displays, such as audio and/or tactile output devices, etc. Generally, the output devices 814 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure and may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data, including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 824 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF, and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 9:
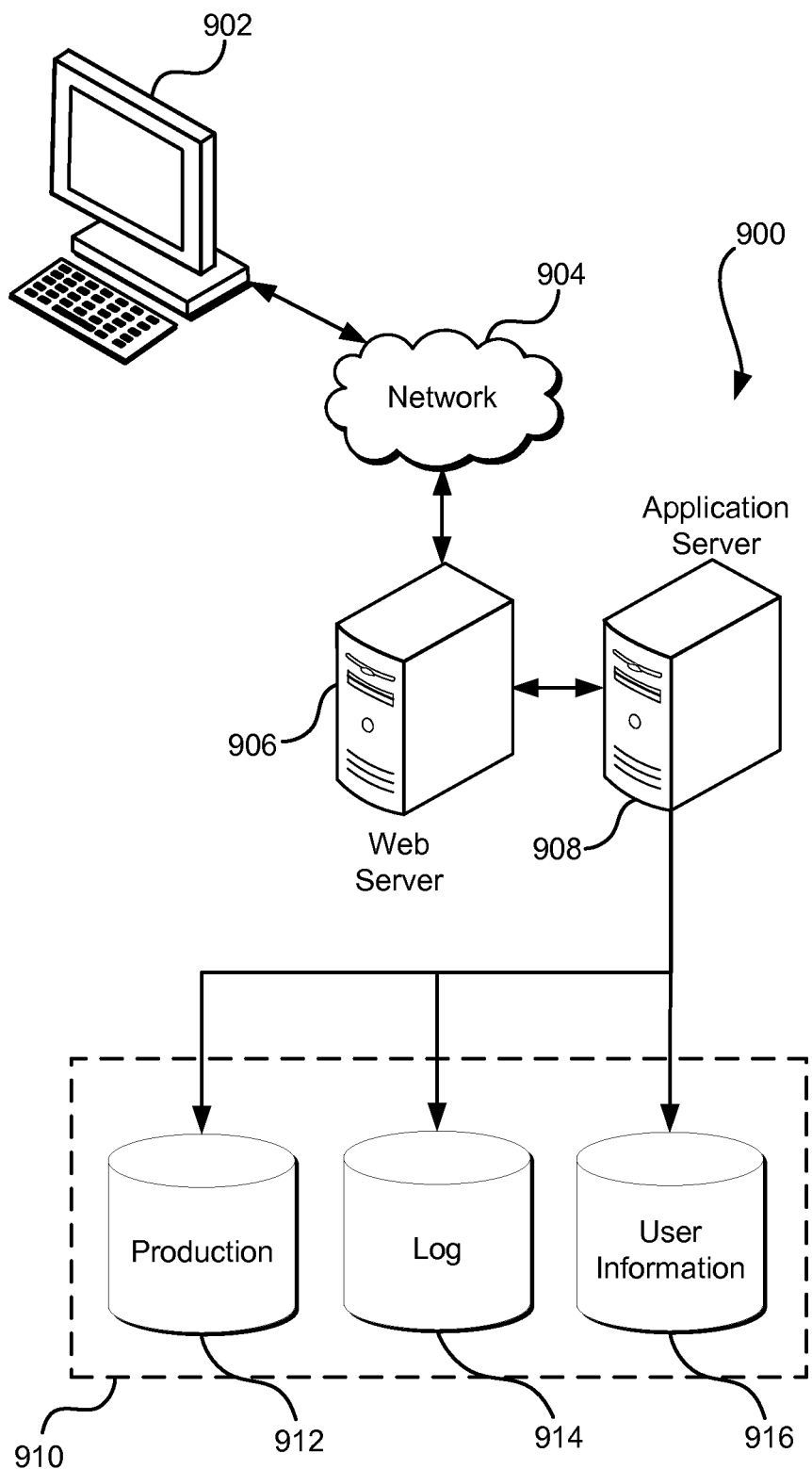
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a request directed to associating at least one companion instance with a mobile device;
    in response to the request, generating a record in a database associating a plurality of companion instances and the mobile device;
    determining which components of an application are to be executed by the plurality of companion instances and instantiating the plurality of companion instances to execute the components of the application;
    loading a first component of the application into memory of at least one companion instance of the plurality of companion instances and a second component of the application into memory of at least one other companion instance of the plurality of companion instances; and using the at least one companion instance to execute the first component of the application on behalf of the mobile device and the at least one other companion instance to execute the second component of the application on behalf of the mobile device.

2. The computer-implemented method of claim 1,
wherein executing the first component of the application and the second component of the application further comprises:
obtaining, from the mobile device, a first data object of a first data type and a second data object of a second data type;
processing, by the at least one companion instance, the first data object; and
processing, by the at least one other companion instance, the second data object.

3. The computer-implemented method of claim 1, wherein the computer-implemented method further comprises:
obtaining a request associated with the application; and
providing the request to the at least one companion instance based at least in part on the association with the application.

4. The computer-implemented method of claim 1, further comprising:
loading into memory of the plurality of companion instances the first application and a second application, wherein the second application includes a component to be executed by the mobile device and the first application and second application are able to access to data stored in a central repository associated with a customer operating the mobile device.

5. A system, comprising:
one or more processors; and
memory with instructions that, as a result of being executed by the one or more processors, cause the system to:
assign a plurality of companion computer systems to a customer account associated with a set of computing resources of a computing resource service provider network, wherein the set of computing resources are suitable for implementing the plurality of the companion computer systems;
instantiate the plurality of companion computer systems as a result of an indication that at least a first component of an application is to be loaded into memory of the plurality of companion computer systems; and
as a result of the instantiation, loading the first component of the application into memory of the plurality of companion computer systems to cause at least one companion computer system of the plurality of companion computer systems to operate in accordance with operation of a second component of the application associated with the customer account.

6. The system of claim 5, wherein the customer account is associated with another companion computer system operated by a customer of a computing resource service provider and configured to execute the second component of the application, wherein the computing resource service provider operates in the computing resource service provider network.

7. The system of claim 5, wherein the plurality of companion computer systems further comprises a cluster including a set of container instances that are registered with the cluster and configured to run one or more components of the application on behalf of the customer account.

8. The system of claim 7, wherein the memory further includes instructions that, as a result of being executed by the one or more processors, cause the system to:
obtain, by the at least one companion computer system of the plurality of companion computer systems, data from the second component of the application executing on the other companion computer system; and
transmit the obtained data to a third computer system, wherein the third computer system includes the set of container instances.

9. The system of claim 6, wherein the instructions that cause the at least one companion computer system to operate in accordance with operation of the second component of the application further include instructions that, as a result of being executed by the one or more processors, cause the at least one companion computer system of the plurality of companion computer systems to listen on a port for a notification indicating the other companion computer system and updating a database with information associated with the notification.

10. The system of claim 6, wherein the memory further includes instructions that, as a result of being executed by the one or more processors, cause the system to:
obtain data captured by one or more sensors of the other companion computer system;
determine a third companion computer system of the plurality of companion computer systems to execute at least one operation associated with the obtained data; and
provide, to the third companion computer system, the obtained data.

11. The system of claim 5, wherein the memory further includes instructions that, as a result of being executed by the one or more processors, cause the system to:
determine, based at least in part on an obtained request, a companion computer system of the plurality of companion computer systems associated with at least one operation of the application indicated in the obtained request; and
cause the companion computer system to execute the at least one operation of the application.

12. The system of claim 5, wherein the system further includes a database containing a record associating the plurality of companion computer system and the customer account, the record further containing information indicating applications associated with particular companion computer systems of the plurality of companion computer systems.

13. The system of claim 5, wherein the memory further includes instructions that, as a result of being executed by the one or more processors, cause the system to:
obtain a request; and
determine a companion computer system of the plurality of companion computer systems to fulfill the request based at least in part on information associated with a requestor responsible for providing the obtained request and data associated with the companion computer system.

14. A non-transitory computer-readable storage medium comprising executable instructions that, as a result of being executed by one or more processors of a computer system, cause the computer system to at least:
obtain a request to provide a set of instances to a mobile device, the set of instances executing operations on behalf of the mobile device using computing resources of a computing resource service provider;
determine which components of an application are to be loaded into memory of the set of instances and load a first component of the application into memory of the set of instances as a result of detecting a second component of the application is loaded into memory of the mobile device; and cause an instance of the set of instances including the first component of the application to fulfill the request.

15. The non-transitory computer-readable storage medium of claim 14, wherein the instructions further comprise instructions that, as a result of being executed by the one or more processors, cause the computer system to update a record contained in a database with information corresponding to the set of instances and the mobile device, the record associating one or more applications with the set of instances.

16. The non-transitory computer-readable storage medium of claim 15, wherein determining the instance to include the first component of the application to fulfill the request is based at least in part on the record in the database.

17. The non-transitory computer-readable storage medium of claim 14, wherein the instructions further comprise instructions that, as a result of being executed by the one or more processors, cause the computer system to, as a result of fulfilling the request, provide a processed data object to the mobile device.

18. The non-transitory computer-readable storage medium of claim 14, wherein the instructions further comprise instructions that, as a result of being executed by the one or more processors, cause the computer system to:

determine a subset of the set of instances to fulfill the request; and cause the instance to provide information associated with fulfillment of the request to the subset such that the subset fulfills the obtained request.

19. The non-transitory computer-readable storage medium of claim 14, wherein the instructions further comprise instructions that, as a result of being executed by the one or more processors, cause the computer system to load a first component of a second application into memory of a second instance of the set of instances, wherein a second component of the second application is loaded into memory of the mobile device.

20. The non-transitory computer-readable storage medium of claim 14, wherein the instructions that cause the computer system to fulfill the request further include instructions that cause the computer system to:

determine a second set of instances associated with a second mobile device; and provide data to the second set of instances, wherein the obtained request further comprises information indicating that the second mobile device and data are to be provided to the second mobile device.

21. The non-transitory computer-readable storage medium of claim 14, wherein the instructions that cause the computer system to fulfill the request further include instructions that cause the computer system to obtain data from a mobile device.

22. The non-transitory computer-readable storage medium of claim 14, wherein the instructions that cause the computer system to determine the instance of the set of instances including the first component of the application to fulfill the request is based at least in part on information corresponding to a customer responsible for providing the request.

* * * * *